(No Model.)
W. SCHOFIELD.
POWER TRANSMITTING DEVICE.
No. 524,354. Patented Aug. 14, 1894.
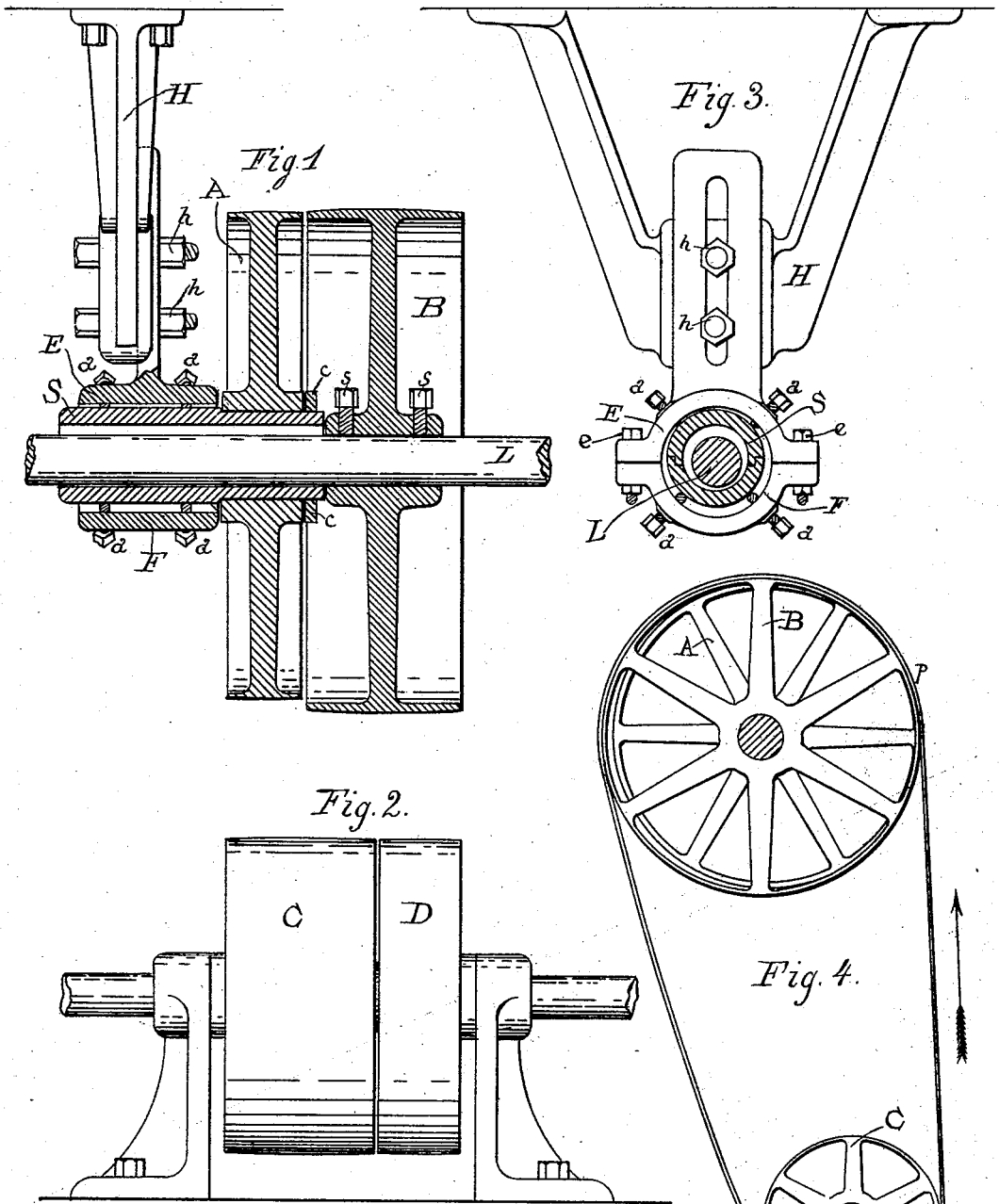
Witnesses
John Dolman
Edward P. Bliss
Inventor
William Schofield
by John Dolman Jr.
Attorney

UNITED STATES PATENT OFFICE.

WILLIAM SCHOFIELD, OF PHILADELPHIA, PENNSYLVANIA.

POWER-TRANSMITTING DEVICE.

SPECIFICATION forming part of Letters Patent No. 524,354, dated August 14, 1894.

Application filed March 2, 1894. Serial No. 502,038. (No model.)

*To all whom it may concern:*

Be it known that I, WILLIAM SCHOFIELD, a citizen of the United States, residing at Philadelphia, in the county of Philadelphia and State of Pennsylvania, have invented a new and useful Improvement in Power-Transmitting Devices, of which the following is a specification.

My invention relates to belt shifting mechanism, and has for its object, first the doing away with strain or wear of the belt, pulleys or other parts when not in use; and, second, the easy shifting of the belt without shock or strain due to starting. The first object is accomplished by having a "dead" pulley concentric, or nearly so, with the line shaft, but unconnected therewith, and a loose pulley on the counter shaft or machine to be driven, upon which two pulleys the belt may rest when not in use. The second object is accomplished by providing means by which the belt may be shifted to the line driving pulley, while still remaining on the loose pulley of the machine, and then the moving belt shifted on and off the tight pulley of the machine when operating. The details of this arrangement will appear by reference to the drawings, in which—

Figure 1 is a vertical sectional view of the preferred arrangement of pulleys on the line shaft and manner of mounting the "dead" pulley. Fig. 2 is a front view of the tight and loose pulleys of the machine, shown in proper vertical plane in relation to the pulleys in Fig. 1. Fig. 3 is a side view of the independent hanger or bracket, which supports the "dead" pulley, showing the line shaft and the sleeve on which the "dead" pulley runs in section. Fig. 4 is a diagram illustrating the preferred mode of arranging the "dead" pulley eccentric to the driving pulley.

B is the ordinary driving pulley, fastened to and rotating with the line shaft L.

A is the "dead" pulley, (which is preferably split for ease in hanging, as are also all the other parts encircling the line shaft,) free to rotate on the sleeve S, on which it is retained by a collar c.

H is a special or independent hanger, on which, by means of bolts h, h, an annular bracket, consisting of the two separable parts E, F, is adjustably supported. Set screws a, a, a, a, pass radially into this bracket, as shown, and hold in adjustable position the sleeve S, out of contact with the shaft L, which, with its pulley B may therefore rotate entirely free from and unencumbered with any part of said hanger, sleeve or "dead" pulley.

I prefer to make the "dead" pulley A, of slightly less diameter than the driving pulley B, and also slightly eccentric thereto for a purpose which will presently appear. I also preferably make the driving pulley B approximately of double the width of face of the "dead" pulley A. In line with these pulleys, that is in the same plane of rotation, are the loose pulley C and tight pulley D of the counter shaft or machine to be driven, the loose pulley C being approximately twice the width of face of the tight pulley D.

The operation of this arrangement would be as follows: Starting with the belt on the "dead" pulley A and loose pulley C, both the machine and the belt would be at rest, and the line shaft L entirely relieved of all work or strain in connection therewith. When it is desired to use this machine, the belt is shifted on to the driving pulley B, while still remaining on the loose pulley C, which operation is easily performed, as the weight of the belt is the only thing required to be moved. The belt being now running, by means of ordinary belt shifting mechanism the machine may be started and stopped by shifting on or off the tight pulley D, the width of the driving pulley B, allowing this movement. When through using the machine, the loosely running belt is shifted on to the "dead" pulley again, when it comes to a stop and the line shaft L is again relieved from that machine with all its belts, pulleys and connections and all wear on the belts or pulleys ceases.

I have said that I prefer to make the "dead" pulley A of less diameter than the driving pulley B; by this means I relieve the strain on the belt when at rest, due to its tension, and avoid stretching the belt; also by arranging the pulley A out of center with B, I can cause the belt to slide more easily from one to the other, than if they were concentric and of different diameters; that is, referring to Fig. 4, when the belt is running in the direction indicated by the arrow, the actual shifting of the belt would take place at about the point $p$, and by having the peripheries of the two pulleys approximately tangent to the same plane at that point, the belt will slide over from one to the other without difficulty.

If the difference in diameter of the two pulleys is small, no serious difficulty will be encountered in shifting the belt even if they are concentric; and many of the benefits of my invention may be obtained when the pulleys A and B are of the same diameter; I therefore do not wish to confine myself to the different diameters and eccentric arrangement shown.

As to the different width of face of the various pulleys, I do not wish to be understood as confining myself to the relative width of face here shown, as it may obviously be varied without departing from the spirit of my invention. It is even possible to have all four pulleys of the same width, and by having the lower pair a little out of line with the upper pair, the method of shifting here described may be accomplished, though I believe not so well, and I prefer the relative width of face shown. It is also obvious that the sleeve S may be extended on both sides of the bracket H, and a "dead" pulley mounted on each end of the same for working different machines.

Having thus described my invention and the best method known to me for working the same, what I claim, and desire to secure by Letters Patent, is—

1. In power transmitting devices, a "dead" pulley and an adjoining driving pulley on the line shaft, in combination with a driving belt, and a tight and loose pulley on the machine to be operated; the boundary between the "dead" and driving pulleys being in a different plane from the boundary between the tight and loose pulleys, so that the belt in shifting shall not pass simultaneously from the dead to the driving pulley and from the loose to the tight pulley, substantially as shown and described.

2. The combination of a narrow "dead" pulley and a wide driving pulley, both on the line shaft; a driving belt; and a wide loose pulley and narrow tight pulley on the machine; the "dead" pulley and loose pulley being on the same side, and the boundary lines between the two sets of pulleys not being in alignment.

WILLIAM SCHOFIELD.

Witnesses:
   OLIVER S. KEELY,
   GEORGE A. HARDMAN.